US011425286B2

(12) United States Patent
Vitale

(10) Patent No.: US 11,425,286 B2
(45) Date of Patent: Aug. 23, 2022

(54) HOUSING ASSEMBLY FOR IMAGE CAPTURE DEVICES

(71) Applicant: GoPro, Inc., San Mateo, CA (US)

(72) Inventor: Nicholas Vitale, Foster City, CA (US)

(73) Assignee: GoPro, Inc., San Mateo, CA (US)

( * ) Notice: Subject to any disclaimer, the term of this patent is extended or adjusted under 35 U.S.C. 154(b) by 75 days.

(21) Appl. No.: 16/836,216

(22) Filed: Mar. 31, 2020

(65) Prior Publication Data
US 2021/0306536 A1 Sep. 30, 2021

(51) Int. Cl.
*H04N 5/225* (2006.01)

(52) U.S. Cl.
CPC ....... *H04N 5/22521* (2018.08); *H04N 5/2252* (2013.01); *H04N 5/2253* (2013.01); *H04N 5/2254* (2013.01)

(58) Field of Classification Search
CPC .................................................. H04N 5/22521
See application file for complete search history.

(56) References Cited

U.S. PATENT DOCUMENTS

| | | | |
|---|---|---|---|
| 2,186,610 | A | 1/1940 | Leavitt |
| 3,133,140 | A | 5/1964 | Winchell |
| 4,451,130 | A | 5/1984 | Yan |
| 5,077,567 | A | 12/1991 | Haraguchi |
| 5,828,406 | A | 10/1998 | Parulski |
| 6,079,883 | A | 6/2000 | Mori |
| 7,161,749 | B2 | 1/2007 | Sakurai |
| 7,717,630 | B1 | 5/2010 | Wan |
| 8,294,988 | B2 | 10/2012 | Cook |
| 9,743,001 | B1 | 8/2017 | Stec |
| 9,995,990 | B2 | 6/2018 | Lim |
| 10,401,705 | B2 | 9/2019 | Lim |

(Continued)

FOREIGN PATENT DOCUMENTS

| | | |
|---|---|---|
| EP | 1619882 A2 | 1/2006 |
| WO | 2020055511 A1 | 3/2020 |

OTHER PUBLICATIONS

U.S. Appl. No. 16/803,139, filed Feb. 27, 2020, Crow et al., entitled Heatsink of an Image Capture Device.

(Continued)

*Primary Examiner* — Gary C Vieaux
(74) *Attorney, Agent, or Firm* — Young Basile Hanlon & MacFarlane, P.C.

(57) ABSTRACT

A housing assembly for an image capture device is disclosed. The housing assembly includes: a front housing portion defining an opening; a rear housing portion that is connected (secured) to the front housing portion so as to form a watertight seal therebetween; a mounting structure, which is configured as a discrete component that is separate from the front housing portion and the rear housing portion and connected (secured) to the front housing portion adjacent to the opening; a first sealing member that is positioned between the mounting structure and the front housing portion and configured to form a watertight seal therebetween; an integrated sensor-lens assembly (ISLA) that is connected (secured) to the mounting structure such that the ISLA extends through the opening in the front housing portion; and a second sealing member that is positioned between the ISLA and the mounting structure and configured to form a watertight seal therebetween.

20 Claims, 11 Drawing Sheets

(56) References Cited

U.S. PATENT DOCUMENTS

| | | | | |
|---|---|---|---|---|
| 10,701,249 | B1* | 6/2020 | Guo | H05K 7/20309 |
| 10,845,675 | B2 | 11/2020 | Lim | |
| 2004/0240870 | A1 | 12/2004 | Stiehler | |
| 2006/0007551 | A1 | 1/2006 | Sakurai | |
| 2008/0094708 | A1 | 4/2008 | Huang | |
| 2009/0002823 | A1 | 1/2009 | Law | |
| 2009/0091827 | A1 | 4/2009 | Gauger | |
| 2010/0149408 | A1 | 6/2010 | Ito | |
| 2010/0302638 | A1 | 12/2010 | Cuadra | |
| 2013/0028590 | A1 | 1/2013 | Hasuda | |
| 2013/0071101 | A1 | 3/2013 | Idera | |
| 2013/0129338 | A1 | 5/2013 | Dowell | |
| 2014/0043733 | A1 | 2/2014 | Huang | |
| 2015/0093104 | A1 | 4/2015 | Clyne | |
| 2016/0066459 | A1* | 3/2016 | Rayner | G06F 1/1601 |
| | | | | 224/191 |
| 2016/0181722 | A1* | 6/2016 | Tsai | H01R 13/5202 |
| | | | | 439/587 |
| 2017/0102512 | A1 | 4/2017 | Yamaoda | |
| 2017/0102513 | A1 | 4/2017 | Ogata | |
| 2018/0017785 | A1 | 1/2018 | Bulgajewski | |
| 2018/0091775 | A1 | 3/2018 | Jung | |
| 2018/0143512 | A1* | 5/2018 | Campbell | H04N 5/2254 |
| 2019/0158709 | A1* | 5/2019 | Petty | H04N 5/2252 |
| 2019/0208099 | A1* | 7/2019 | Cotoros | H04N 5/22521 |
| 2019/0342473 | A1 | 11/2019 | Clearman | |
| 2020/0026023 | A1 | 1/2020 | Nagaoka | |
| 2021/0274067 | A1* | 9/2021 | Crow | H04N 5/2257 |

OTHER PUBLICATIONS

Geometric Image Transformations, https://docs.opencv.org/2.4/modules/imgproc/doc/geometric_transformations.html?highlight=resize#cv2.resize, OpenCV2.4.13.7, retrieved on Aug. 4, 2020, 11 pages.

International Search Report and Written Opinion for App. No. PCT/US2020/042749, dated Apr. 15, 2021, 10 pages.

Miscellaneous Image Transformations, https://docs.opencv.org/2.4/modules/imgproc/doc/miscellaneous_transformations.html#cvtcolor, OpenCV2.4.13.7, retrieved on Aug. 4, 2020, 12 pages.

Scipy.optimize.minimize, https://docs.scipy.org/doc/scipy/reference/generated/scipy.optimize.minimize.html, retrieved on Aug. 4, 2020, 6 pages.

Structural Analysis and Shape Descriptors, https://docs.opencv.org/2.4/modules/imgproc/doc/structural_analysis_and_shape_descriptors.html?highlight=minenclosingcircle#minenclosingcircle, retrieved on Aug. 4, 2020, 27 pages.

Structural Analysis and Shape Descriptors, https://docs.opencv.org/3.4/d3/dc0/group_imgproc_shape.html#ga17ed9f5d79ae97bd4c7cf18403e1689a, OpenCV, retrieved on Aug. 4, 2020, 12 pages.

Wikipedia, Histogram, https://en.wikipedia.org/wiki/Histogram#Cumulative_histogram, retrieved on Aug. 4, 2020, 7 pages.

Wikipedia, Magic number (programming), https://en.wikipedia.org/wiki/Magic_number_%28programming%29, retrieved on Aug. 4, 2020, 8 pages.

Wikipedia, Median absolute deviation, https://en.wikipedia.org/wiki/Median_absolute_deviation, retrieved on Aug. 4, 2020, 3 pages.

Wikipedia, Random sample consensus, https://en.wikipedia.org/wiki/Random_sample_consensus, retrieved on Aug. 4, 2020, 5 pages.

Wikipedia, YUV, https://en.wikipedia.org/wiki/YUV, retrieved on Aug. 4, 2020, 9 pages.

International Search Report and Written Opinion for App. No. PCT/US2021/024462, dated Jul. 8, 2021, 10 pages.

International Search Report and Written Opinion for App. No. PCT/US2021/037757, dated Oct. 7, 2021, 6 pages.

* cited by examiner

FIG. 13
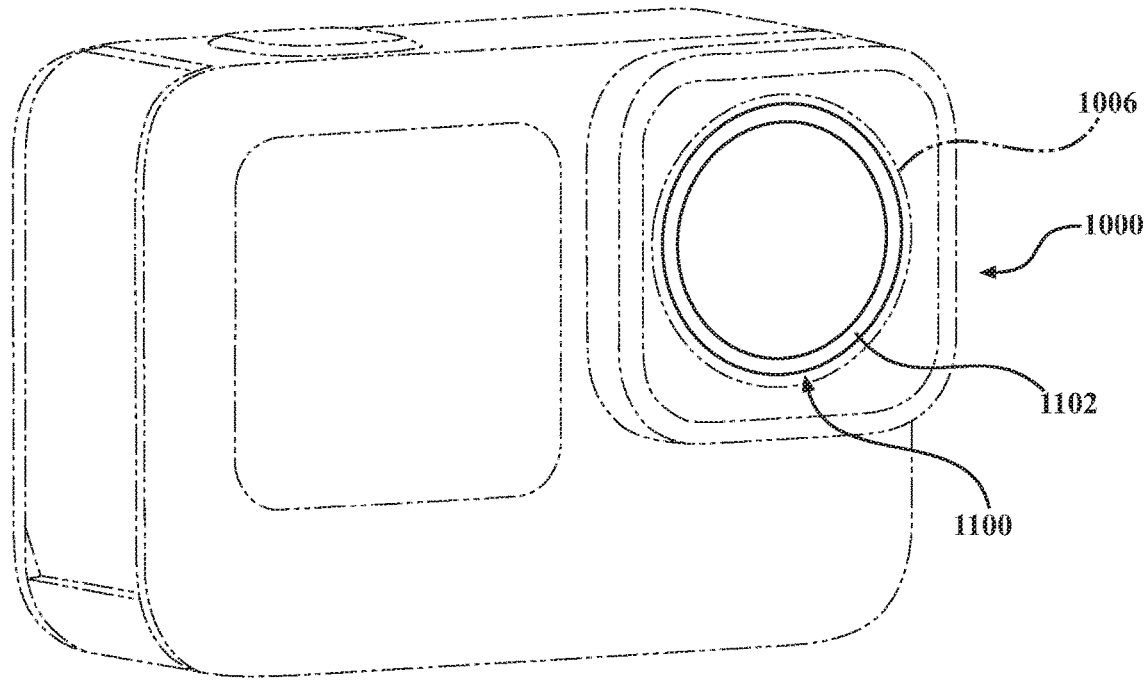
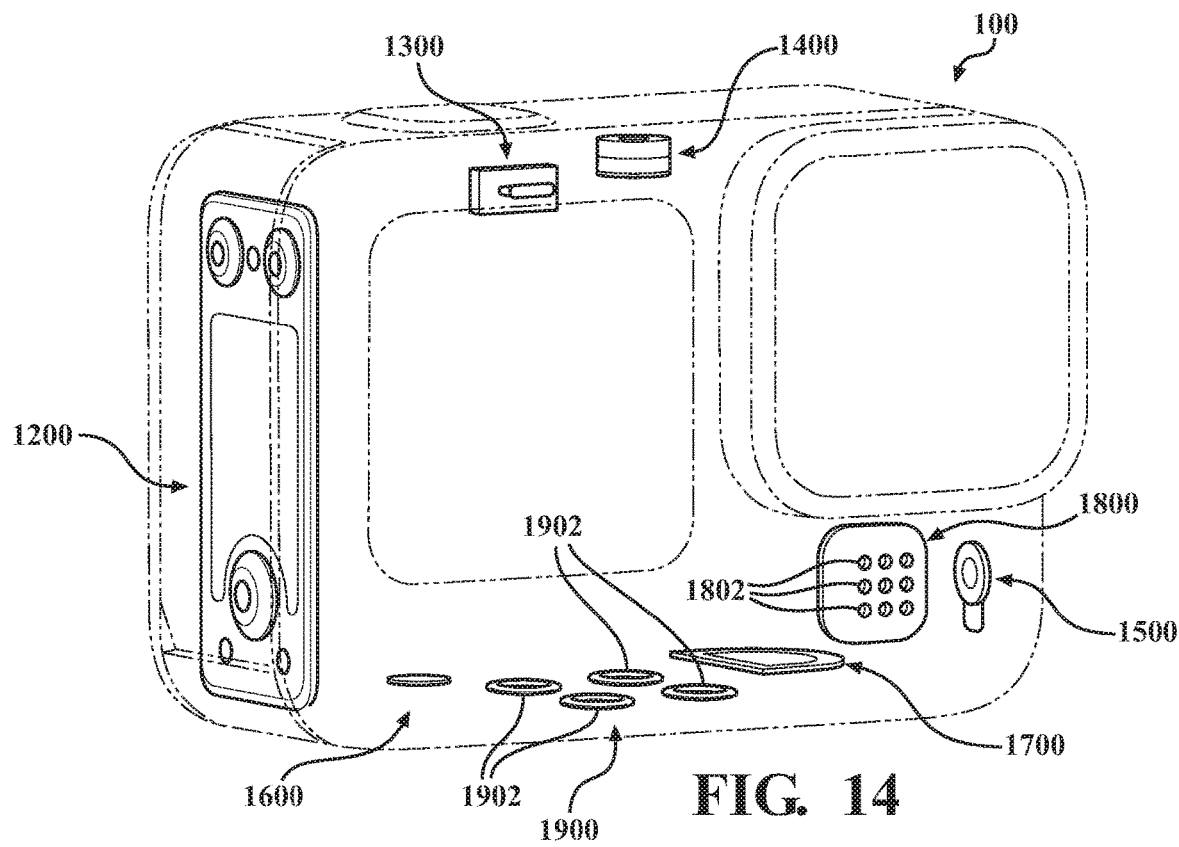
FIG. 14

HOUSING ASSEMBLY FOR IMAGE CAPTURE DEVICES

TECHNICAL FIELD

The present disclosure relates generally to image capture devices and, more specifically, to a housing assembly for such devices.

BACKGROUND

Image capture devices are used in various applications, including, for example, handheld cameras and video recorders, drones, etc. Image capture devices typically include one or more optical elements (e.g., lenses) that capture content by receiving and focusing light as well as one or more image sensors that convert the captured content into an electronic image signal that is processed by an image signal processor to form an image. In some image capture devices, the optical element(s) and the image sensors are integrated into a single unit known as an integrated sensor-lens assembly (ISLA). In addition to the ISLA, image capture devices include an array of internal components, which can result in a cumbersome, complex assembly process.

To address this issue, the present disclosure describes an improved housing assembly for image capture devices that not only simplifies assembly, but provides a watertight internal environment.

SUMMARY

In one aspect of the present disclosure, a housing assembly for an image capture device is disclosed. The housing assembly includes: a front housing portion defining an opening; a rear housing portion that is connected (secured) to the front housing portion so as to form a watertight seal therebetween; a mounting structure that is connected (secured) to the front housing portion adjacent to the opening; a first sealing member that is positioned between the mounting structure and the front housing portion and configured to form a watertight seal therebetween; an integrated sensor-lens assembly (ISLA) that is connected (secured) to the mounting structure such that the ISLA extends through the opening in the front housing portion; and a second sealing member that is positioned between the ISLA and the mounting structure and configured to form a watertight seal therebetween. In certain embodiments, the mounting structure may be configured as a discrete component that is separate from the front housing portion and the rear housing portion. In certain embodiments, the front housing portion may define a tongue and the rear housing portion may define a recess (e.g., a groove) that is configured to receive the tongue. In certain embodiments, the housing assembly may include an adhesive to secure the tongue within the recess to thereby form the watertight seal between the front housing portion and the rear housing portion. In certain embodiments, the front housing portion may include a flange defining the opening. In certain embodiments, the mounting structure may be connected (secured) to the flange. In certain embodiments, the flange may define a channel that is configured to receive the first sealing member. In certain embodiments, the first sealing member may include a first configuration and the second sealing member may include a second configuration that is different from the first configuration. In certain embodiments, the mounting structure may include first openings that are configured to receive first fasteners to secure the mounting structure to the front housing portion and second openings that are configured to receive second fasteners to secure the ISLA to the mounting structure. In certain embodiments, the second sealing member may include a rib and feet that extend radially outward from the rib. In certain embodiments, the feet may be spaced circumferentially from each other so as to define windows therebetween that are configured to receive the second fasteners such that the second fasteners are extendable through the ISLA and the second sealing member into the mounting structure. In certain embodiments, the mounting structure may be configured for releasable connection to a cover that is configured to conceal the ISLA, whereby the mounting structure facilitates alignment between the cover and the ISLA and between the cover and the front housing portion. In certain embodiments, the housing assembly may further include a third sealing member that is positioned between the cover and the mounting structure and configured to form a watertight seal therebetween. In certain embodiments, the mounting structure may include a collar and ears that extend radially outward from the collar. In certain embodiments, the third sealing member may be received by the collar. It is envisioned that the housing assembly for an image capture device described above may include any combination of the features and the elements described in this paragraph.

In another aspect of the present disclosure, a housing assembly for an image capture device is disclosed. The housing assembly includes: a front housing portion; a rear housing portion that is connected (secured) to the front housing portion so as to form a watertight seal therebetween; a mounting structure that is removably connected (secured) to the front housing portion; and an integrated sensor-lens assembly (ISLA) that is connected (secured) to the mounting structure. In certain embodiments, the ISLA may be directly connected to the mounting structure. In certain embodiments, the housing assembly may further include a heatsink. In certain embodiments, the ISLA may extend through the heatsink. In certain embodiments, the mounting structure may be formed as a discrete component that is separate from the heatsink. In certain embodiments, the mounting structure may be sealingly connected to both the front housing portion and the ISLA. In certain embodiments, the housing assembly may further include a first sealing member that is positioned between the front housing portion and the mounting structure and a second sealing member that is positioned between the mounting structure and the ISLA. In certain embodiments, the first sealing member and the second sealing member may have different configurations. It is envisioned that the housing assembly for an image capture device described above may include any combination of the features and the elements described in this paragraph.

In another aspect of the present disclosure, a method of assembling an image capture device is disclosed. The method includes: connecting a mounting structure to a front housing portion of the image capture device such that a watertight seal is formed therebetween; positioning a heatsink within the front housing portion; connecting an integrated sensor-lens assembly (ISLA) to the mounting structure such that a watertight seal is formed therebetween; and connecting a rear housing portion of the image capture device to the front housing portion such that a watertight seal is formed therebetween. In certain embodiments, the method may further include positioning a first sealing member between the front housing portion and the mounting structure and positioning a second sealing member between the mounting structure and the ISLA. In certain embodiments, connecting the ISLA to the mounting structure may include inserting the ISLA through a corresponding opening in the heatsink such that the ISLA extends through the heatsink. It is envisioned that the method of assembling an image capture device described above may include any combination of the features and the elements described in this paragraph.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 13 is a front, perspective view of the housing assembly illustrating a removable cover configured to protect and conceal a lens of the ISLA and a corresponding sealing member.

FIGS. 14 and 15 are front, perspective view of the housing assembly illustrating a plurality of internal sealing members.

DETAILED DESCRIPTION

Figure 1A:
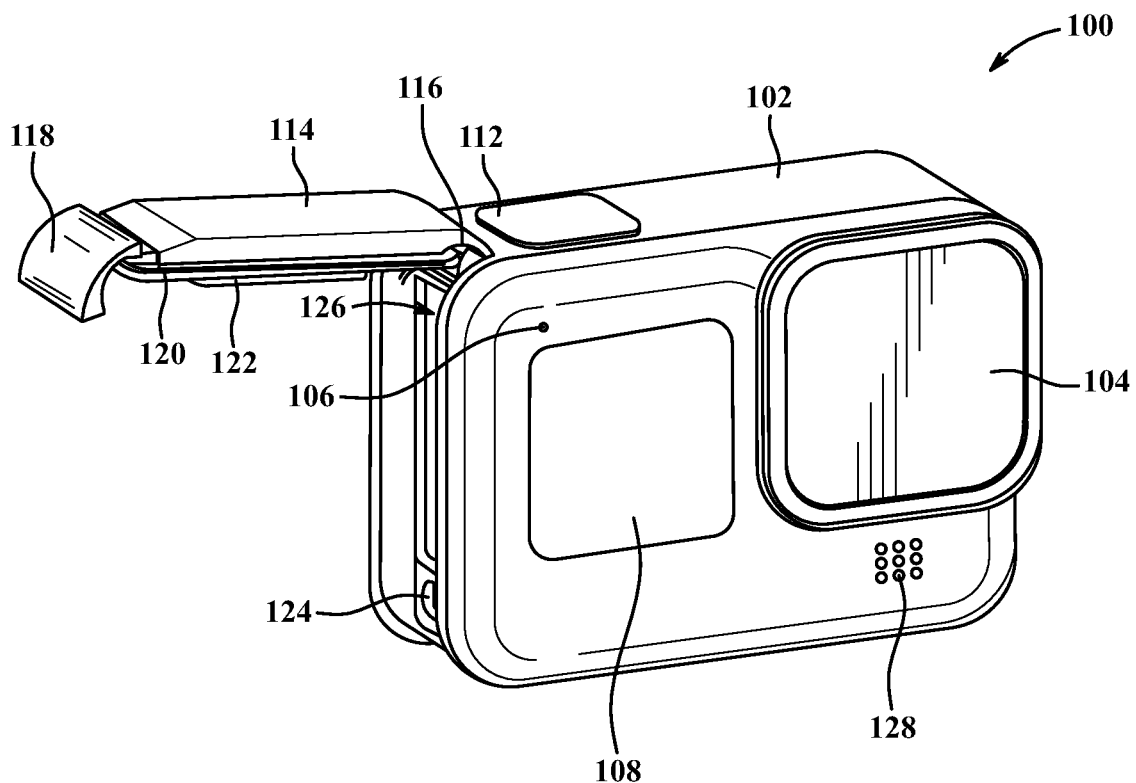
FIGS. 1A-B are isometric views of an example of an image capture device.

The present disclosure describes various embodiments of housing assemblies for image capture devices. The housing assemblies described herein simplify the assembly process by reducing the number of required connections and reducing (if not entirely eliminating) blind steps while improving positional accuracy (alignment) of the components of the image capture device to refine operability and enhance the overall fit and finish.

The presently disclosed housing assemblies include: a front housing portion; a rear portion that is connected (secured) to the front housing portion so as to form a watertight seal therebetween; a mounting structure (e.g., a bayonet); an integrated sensor-lens assembly (ISLA); and a plurality of sealing members. More specifically, the housing assemblies described herein include a first sealing member that is positioned between the front housing portion and the mounting structure and a second sealing member that is positioned between the mounting structure and the ISLA. The sealing members facilitate the formation of watertight seals between the front housing portion, the mounting structure, and the ISLA and eliminate any need to form a seal directly between the ISLA and the front housing portion, which simplifies the assembly process. The mounting structure is configured as a discrete component that is separate from the front housing portion, the rear housing portion, and the heatsink of the image capture device.

During assembly, the mounting structure is initially connected to the front housing portion with the first sealing member being positioned therebetween. Thereafter, a series of ancillary components (e.g., the light pipe, the drain cover, etc.) and the heatsink are connected to the front housing portion so as to permit connection of the GPS board, the main board, the battery cage, etc., to the heatsink as well as the establishment of any other necessary electrical connections. The ISLA is then passed through an opening in the heatsink and connected to the mounting structure such that the second sealing member is positioned between the ISLA and mounting structure. A rear display is then connected (secured) to the rear housing portion and the heatsink before adhesively securing the rear housing portion to the front housing portion. The front and rear housing portions, which are configured for engagement in a tongue-and-groove fashion, are then connected using an adhesive to establish a watertight internal environment for the components of the image capture device and thereby inhibit (if not entirely prevent) the entry of water, debris, etc.

The method of assembly facilitated by the configurations of the front and rear housing portions, the mounting structure, and the ISLA allows for connection of the ISLA to the front housing portion via the mounting structure. The connection of the ISLA to the front housing portion established by the mounting structure improves the relative positional accuracy of the ISLA, the front and rear housing portions, and the removable cover that conceals and protects the lens of the ISLA, which enhances the fit and finish of the image capture device upon assembly (and the overall aesthetic appearance) as well as sealing of the image capture device. Moreover, the architecture of the housing assembly described herein allows for a majority of the components of the image capture device to be assembled into and connected to the front housing portion (either directly or indirectly), rather than dividing assembly and connection between the front and rear housing portions. Concentrating assembly and connection to the front housing portion improves visibility, which allows for more precise placement and connection of the various components of the image capture device and more efficient testing.

Figure 1B:
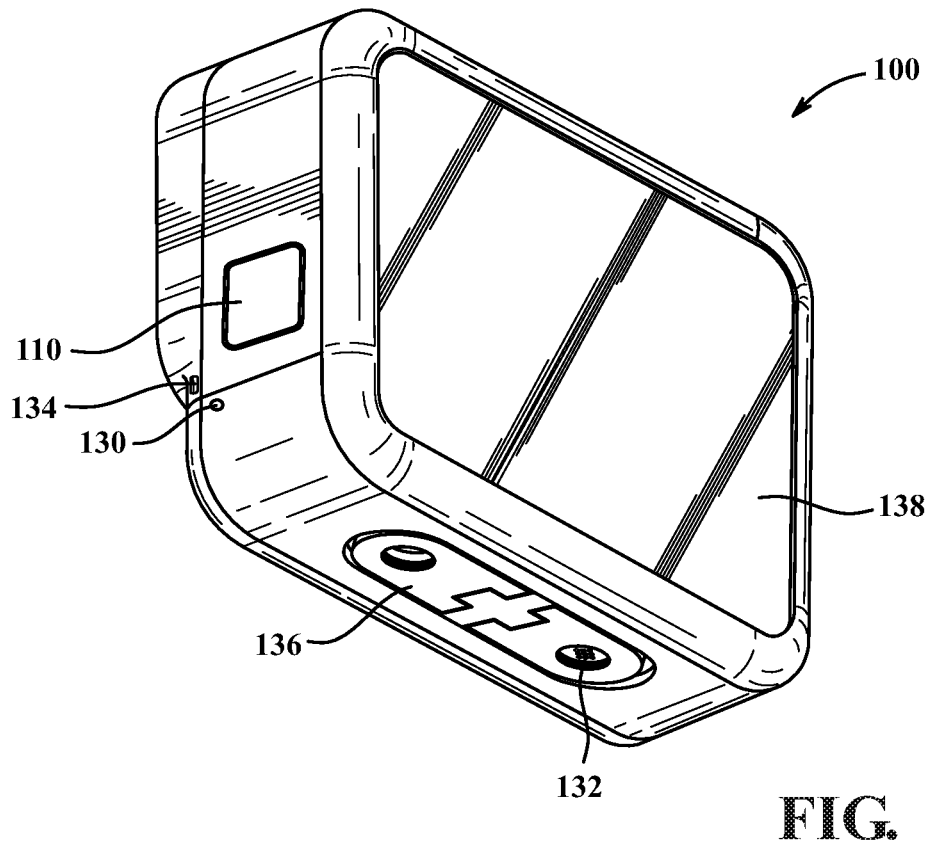

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.)

internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
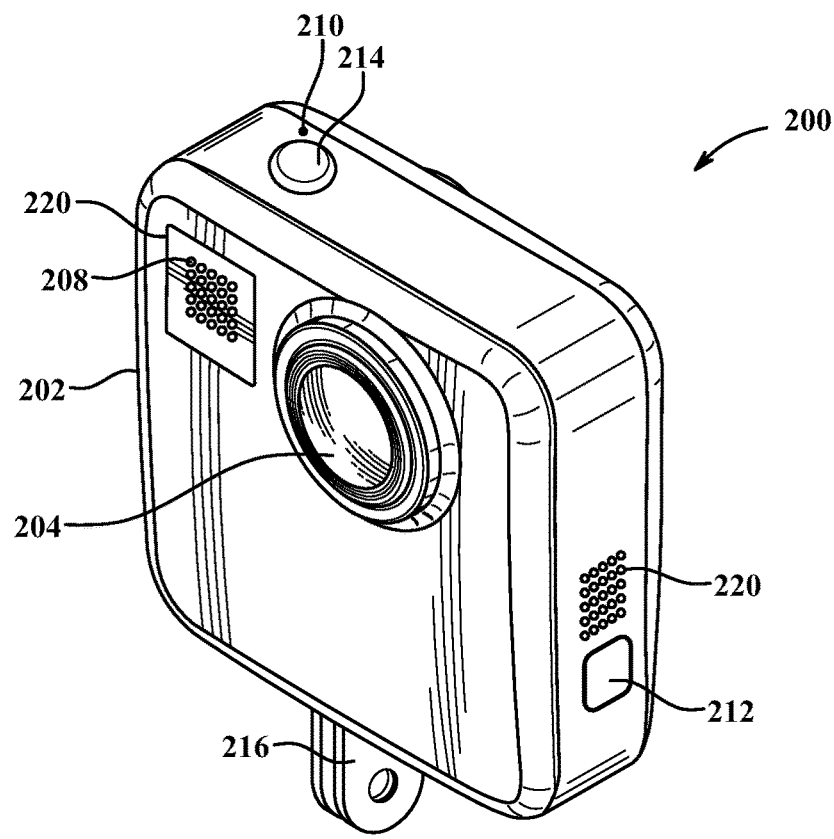
FIGS. 2A-B are isometric views of another example of an image capture device.
Figure 2B:
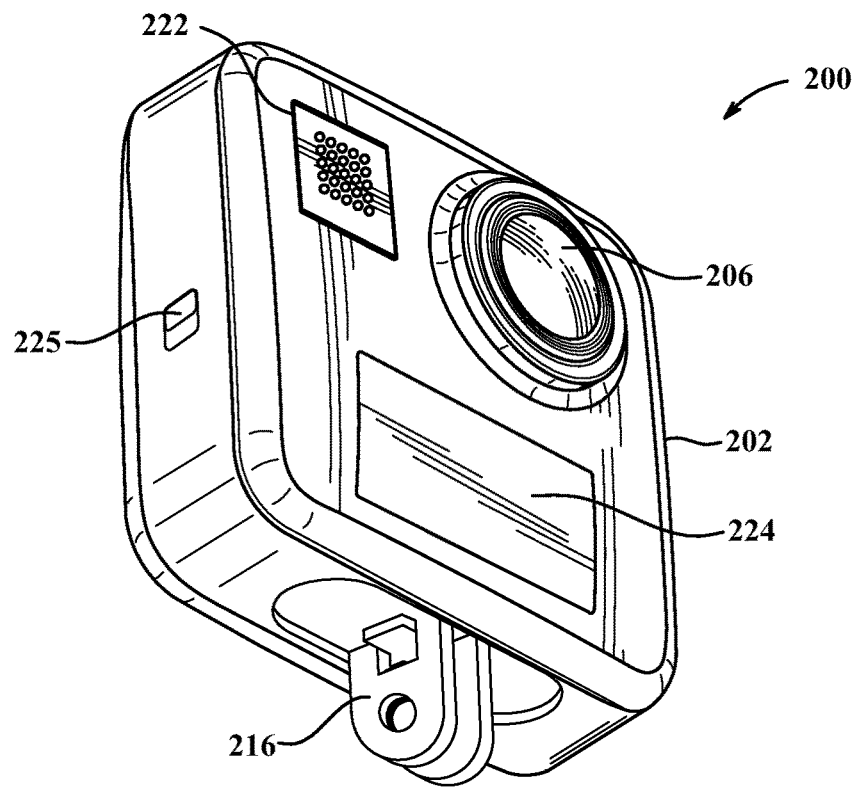

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
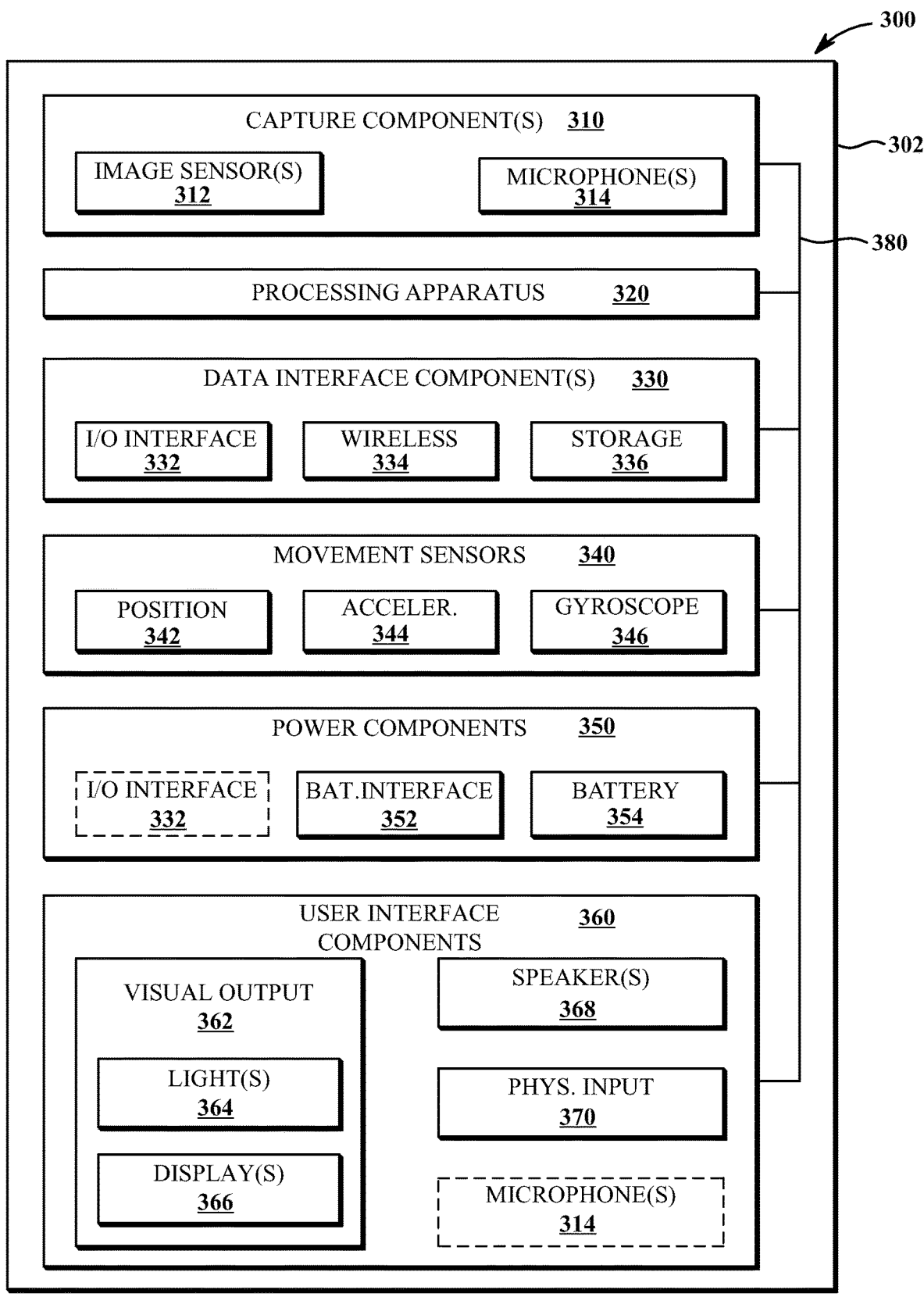
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-B.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include the I/O interface 332, as indicated in dotted line, and the power components 350 may receive power from an external source, such as a wall plug or external battery, for operating the image capture device 300 and/or charging the battery 354 of the image capture device 300.

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4:
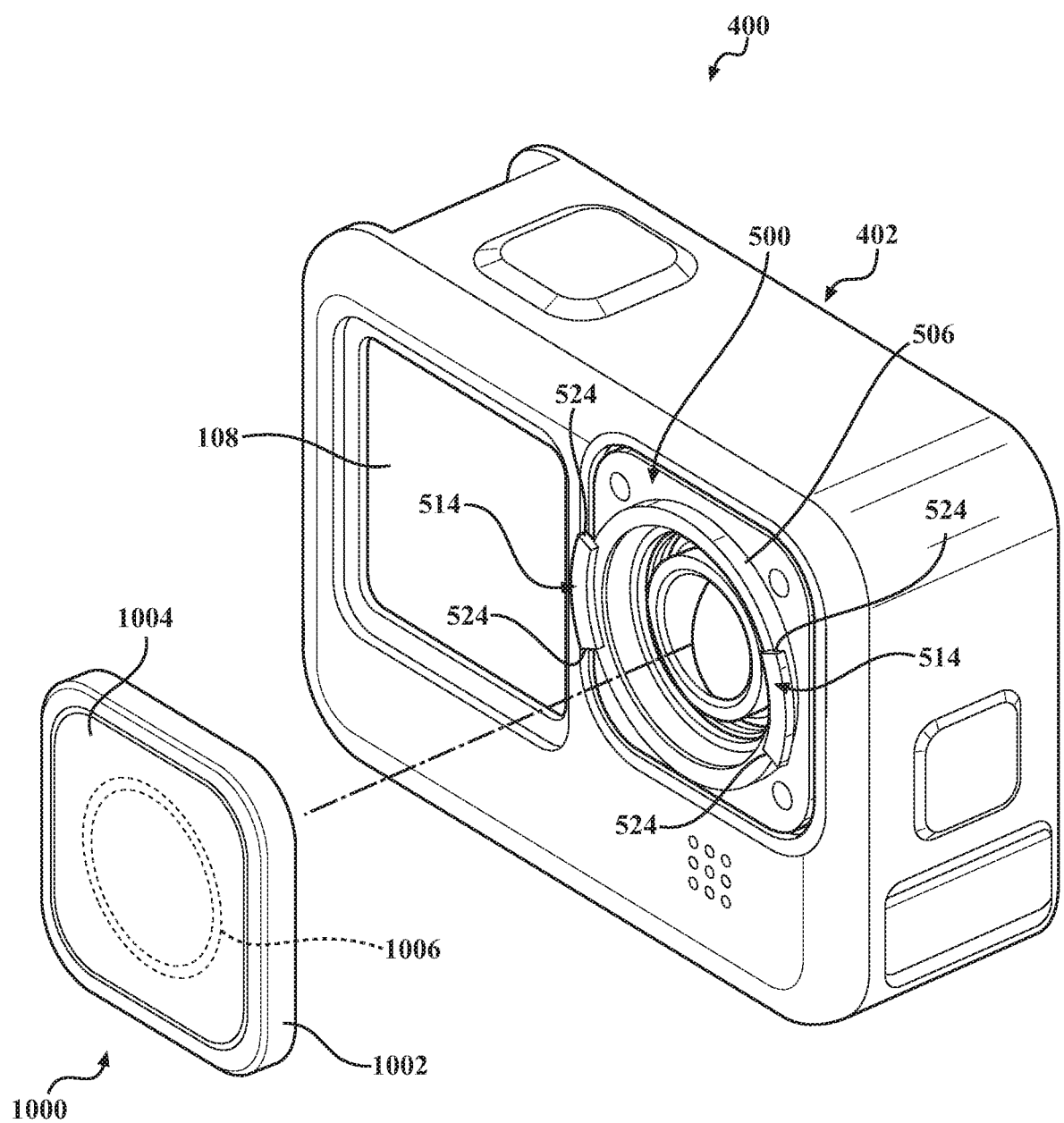
FIG. 4 is a front, perspective view of a housing assembly for an image capture device including a front housing portion and a rear housing portion.
Figure 5:
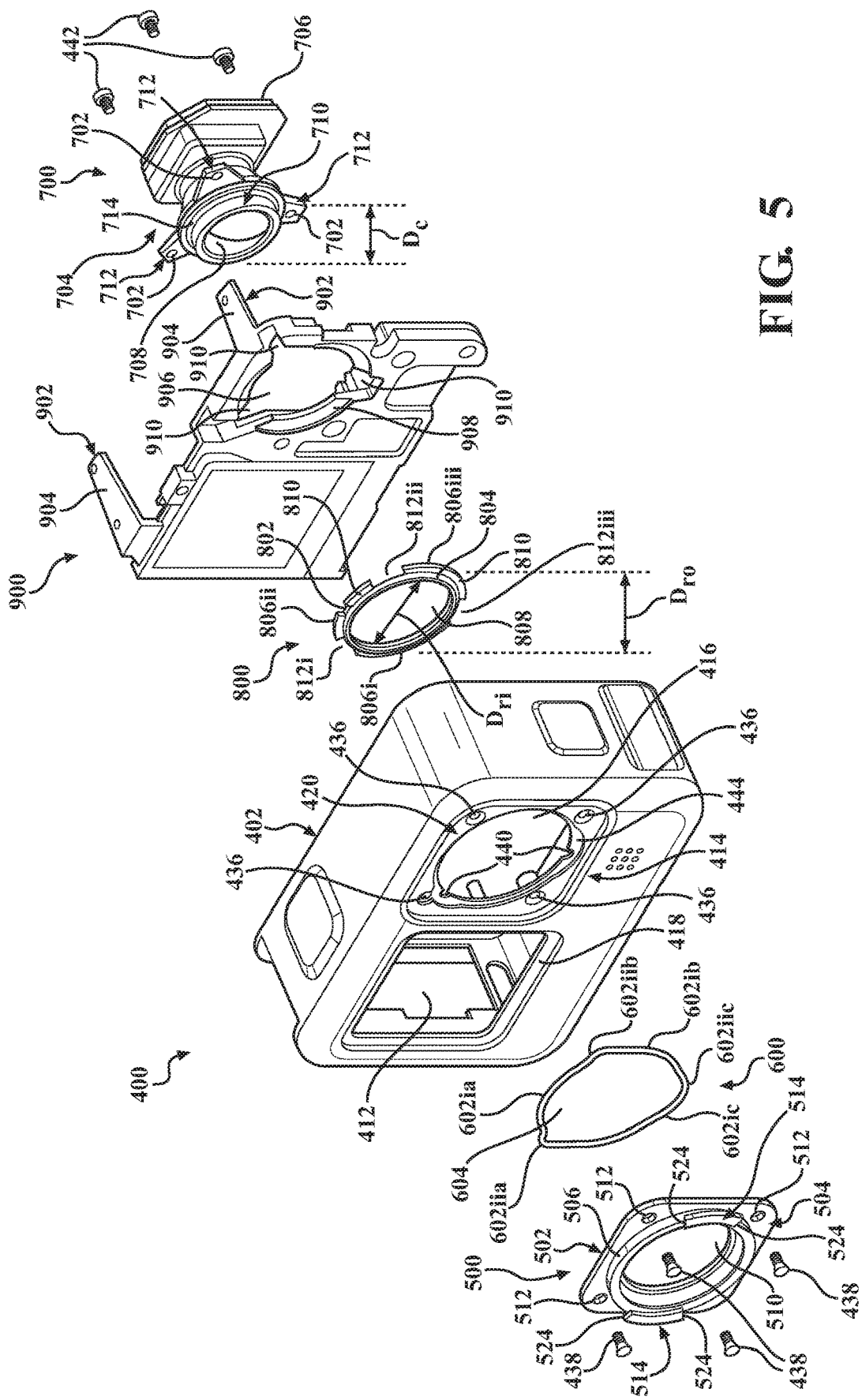
FIG. 5 is a partial, front, perspective view of the housing assembly seen in FIG. 4 with parts separated.
Figure 6:
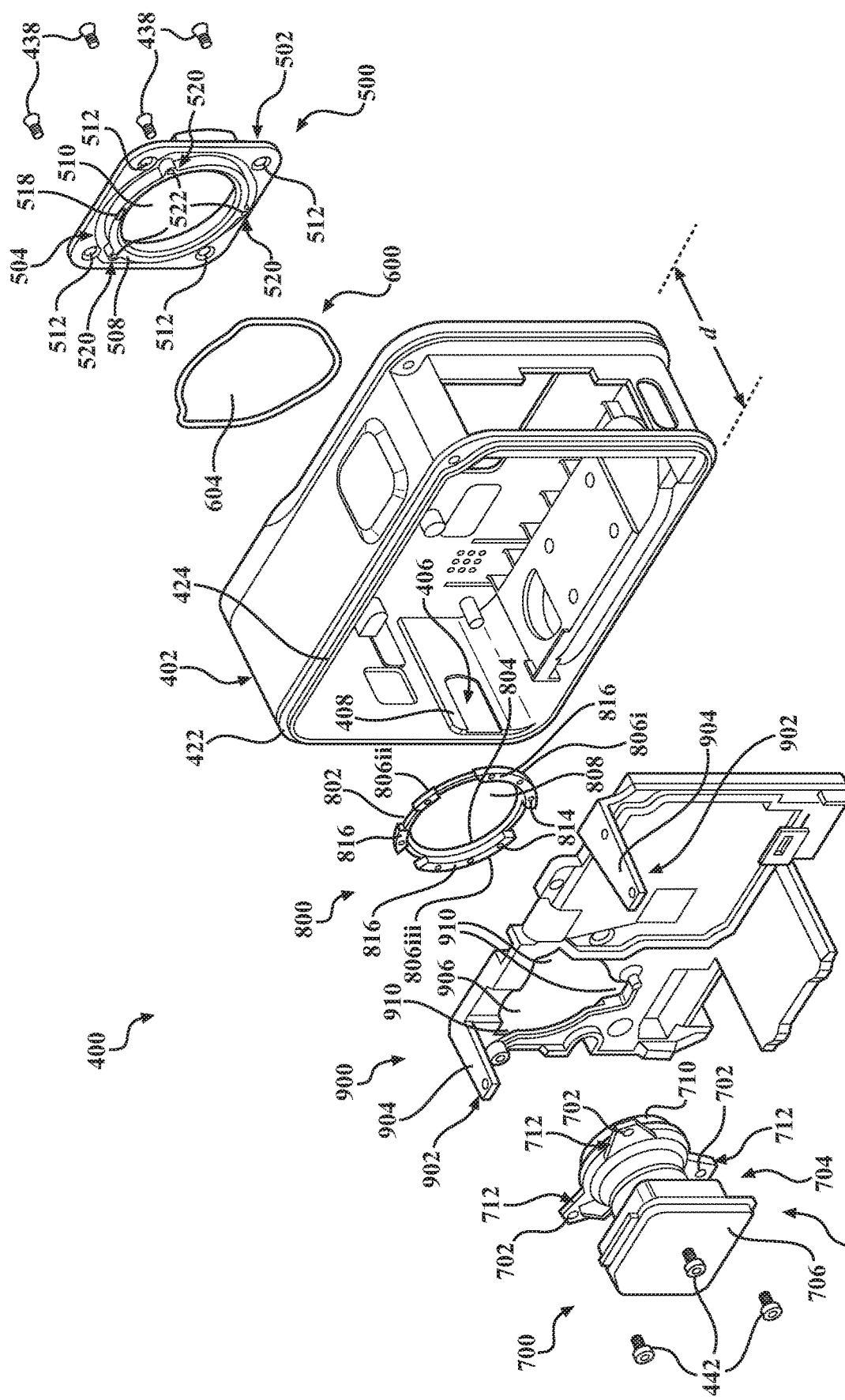
FIG. 6 is a partial, rear, perspective view of the housing assembly seen in FIG. 4 with parts separated.
Figure 7:
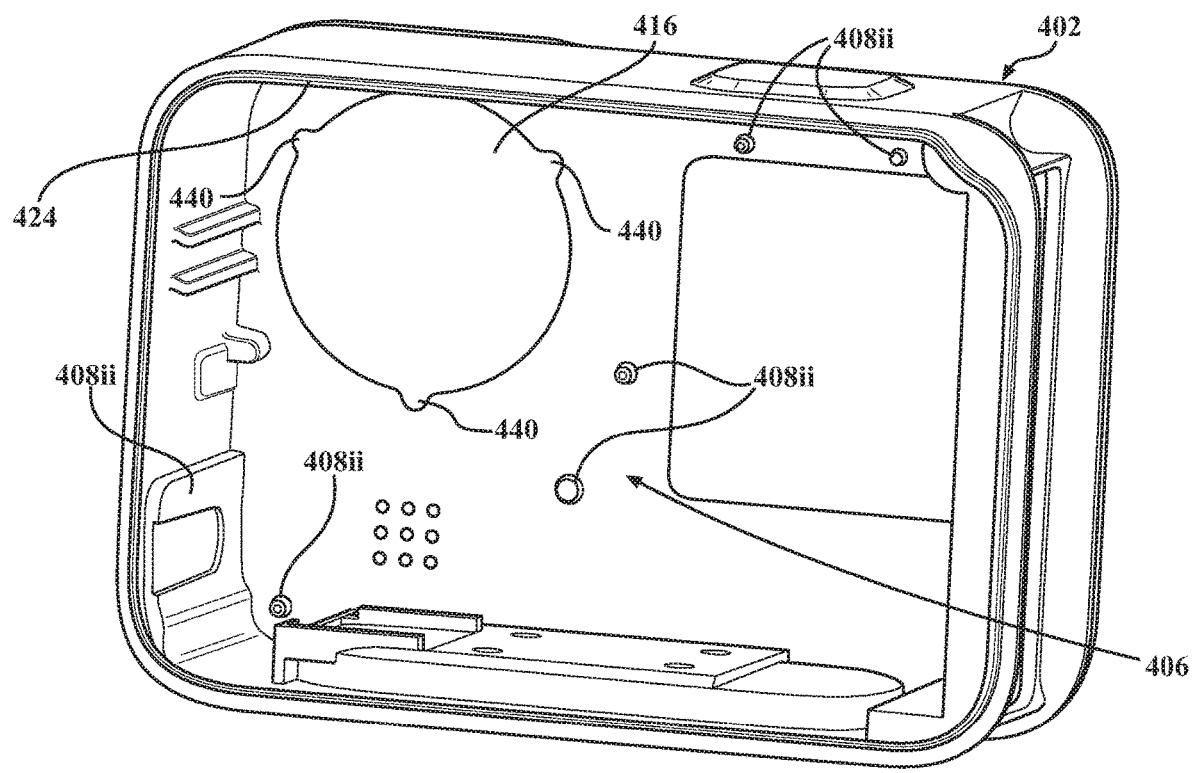
FIG. 7 is a rear, perspective view of the front housing portion.
Figure 8:
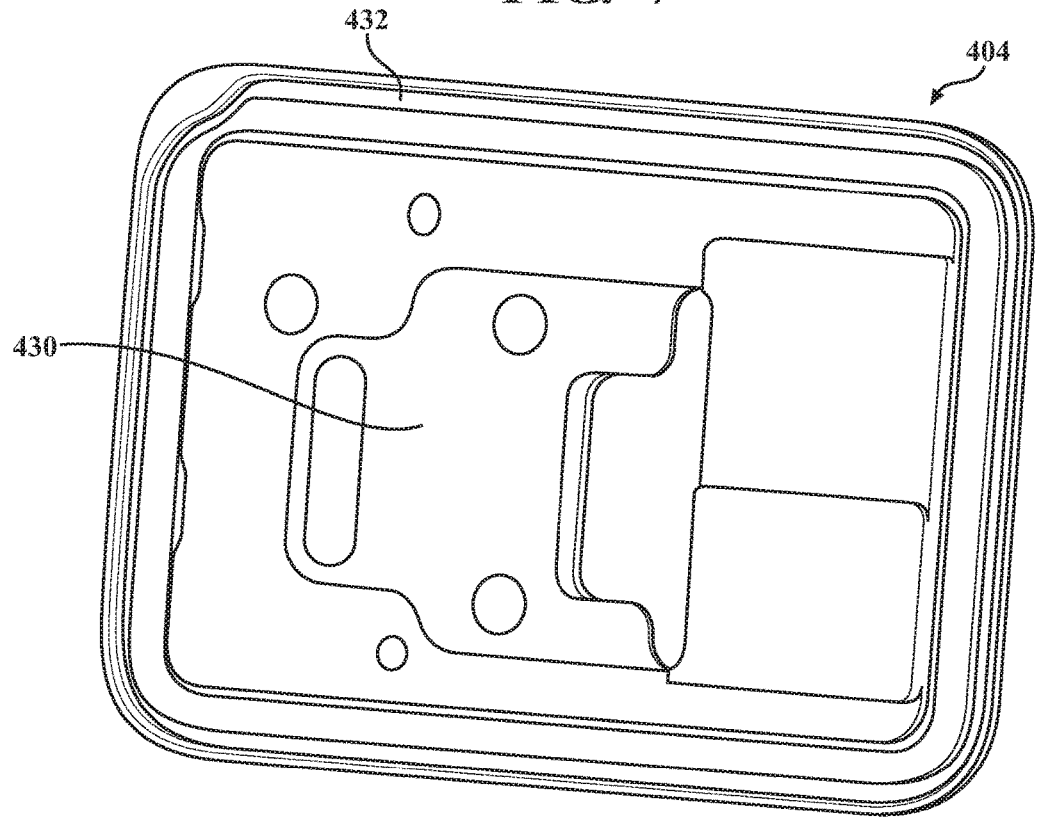
FIG. 8 is a front, perspective view of the rear housing portion.
Figure 9:
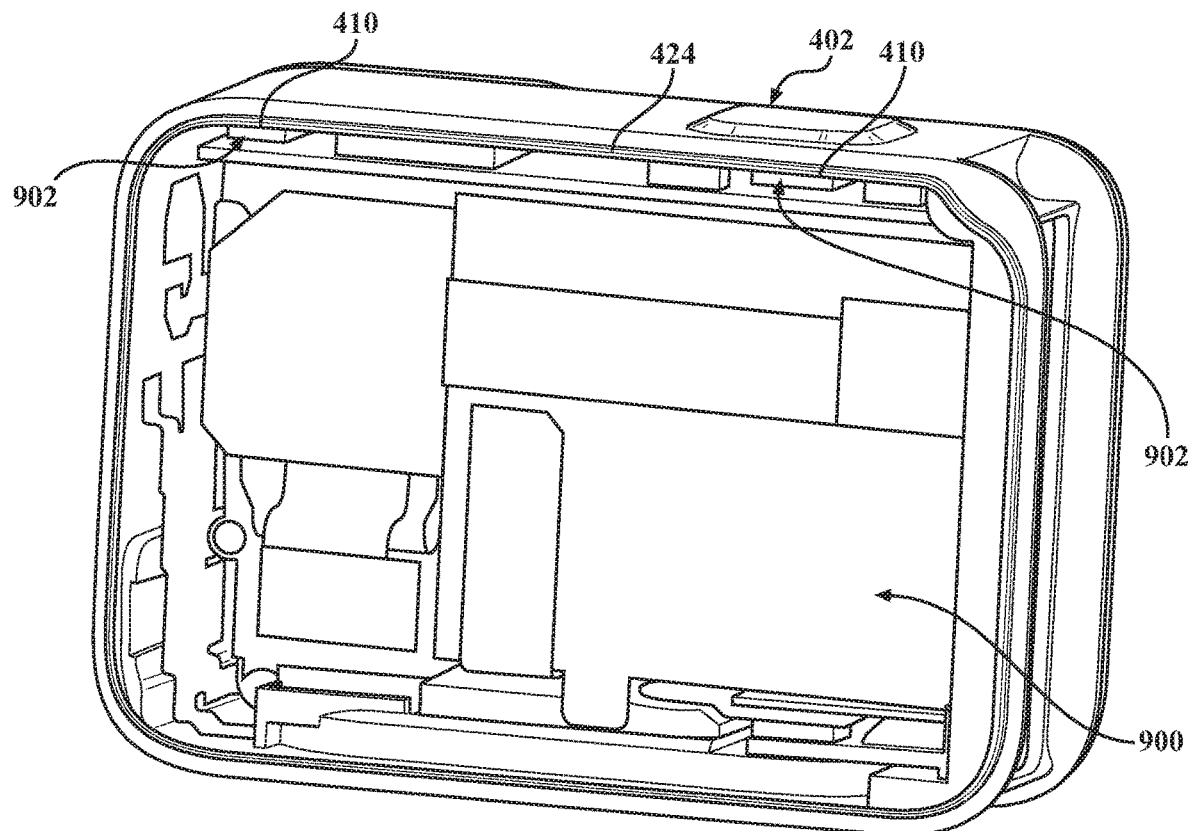
FIG. 9 is a rear, perspective view of the front housing portion (upon assembly of the image capture device) with the rear housing portion removed.
Figure 10:
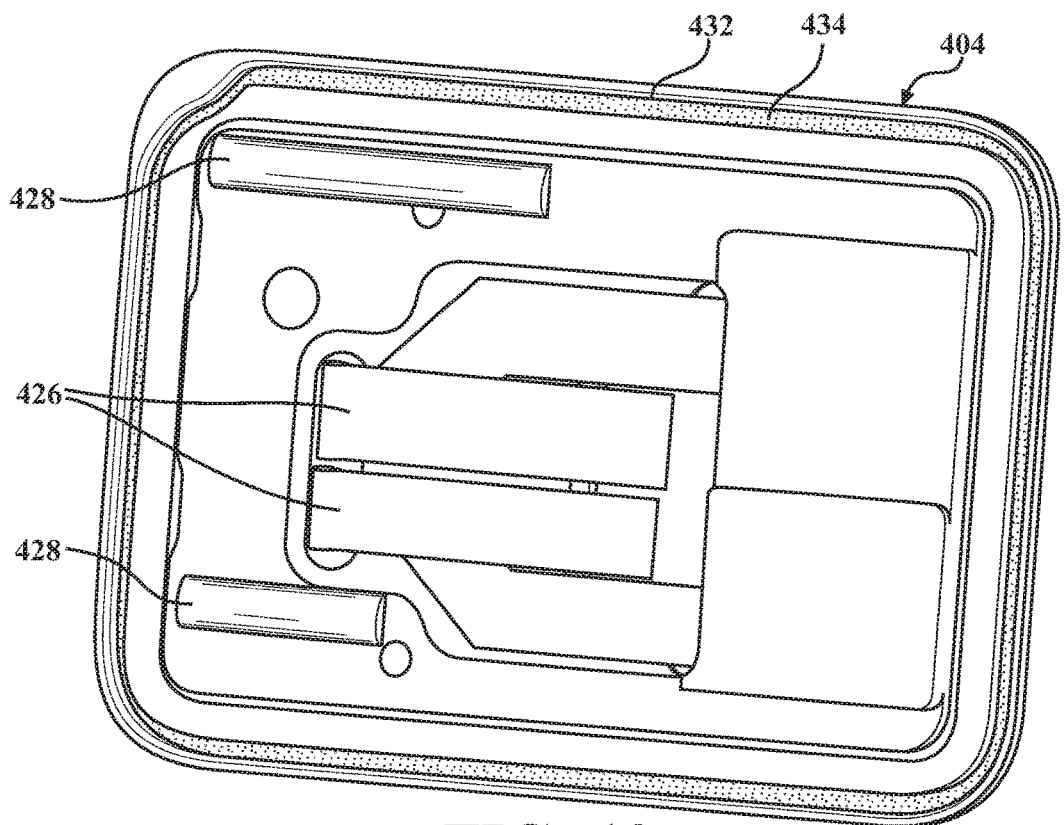
FIG. 10 is a front, perspective view of the rear housing portion (upon assembly of the image capture device) with the front housing portion removed.

Referring now to FIGS. 4-10, a housing assembly 400 will be discussed, which represents an alternate embodiment of the aforedescribed body 102 (FIG. 1A). More specifically, FIG. 4 provides a front, perspective view of the housing assembly 400; FIG. 5 provides a partial, front, perspective view of the housing assembly 400 with parts separated; FIG. 6 provides a partial, rear, perspective view of the housing assembly 400 with parts separated; FIG. 7 provides a rear, perspective view of a front housing portion 402 of the housing assembly 400; FIG. 8 provides a front, perspective view of a rear housing portion 404 of the housing assembly 400; FIG. 9 provides a rear, perspective view of the front housing portion 402 (upon assembly of the image capture device) with the rear housing portion 404 removed; and FIG. 10 provides a front, perspective view of the rear housing portion 404 (upon assembly of the image capture device) with the front housing portion 402 removed. Although generally discussed in connection with the image capture device 100 hereinbelow, it should be appreciated that the housing assembly 400 may be configured for use with any image capture device. For example, it is envisioned that the housing assembly 400 may be adapted for use with the aforedescribed image capture device 200 (FIG. 2A) as an alternate embodiment of the body 202.

The housing assembly 400 includes the aforementioned respective front and rear housing portions 402, 404; a mounting structure 500 (e.g., a bayonet 502); a (first) sealing member 600 that is located between the mounting structure 500 and the front housing portion 402; an integrated sensor-lens assembly (ISLA) 700; a (second) sealing member 800 that is located between the ISLA 700 and the front housing portion 402; a heatsink 900 that is supported by (e.g., connected to) the front housing portion 402; and a cover 1000 (also referred to herein as a removable cover lens) that is removably connectable to (engageable with) the mounting structure 500.

The front housing portion 402 provides a framework (chassis) for various components of the image capture device 100 including, for example, the light pipe, the drain cover, various microphones, the mounting structure 500, the ISLA 700, the cover 1000, and the heatsink 900, which itself provides a framework (chassis) for various components, electronics, and circuity that support operability and functionality of the image capture device 100. For example, the heatsink 900 may support the display 108, the GPS board, the main board, the battery cage, etc. The framework provided by the front housing portion 402 simplifies assembly of the image capture device 100 by focusing the area where connections are to be made and reducing (if not entirely eliminating) blind steps, which facilitates more precise alignment of the components of the image capture device 100, as discussed in further detail below.

The front housing portion 402 includes a series of internal guides 406 (FIGS. 6, 7) that facilitate assembly of the housing assembly 400. For example, the front housing portion 402 may include a locating feature 408i for the microphone gasket and one or more locating pins 408ii that are configured for contact (engagement) with the heatsink 900 during connection to the front housing portion 402 to align and guide the heatsink 900 and facilitate proper location thereof within the front housing portion 402. More specifically, the internal guides 406 are oriented along a depth d of the image capture device 100 such that the heatsink 900 is insertable in a forward direction. The front housing portion 402 further defines a series of mounting locations 410 (FIG. 9) that are configured in correspondence with structural supports 902 (e.g., braces 904) included on the heatsink 900 to further facilitate secured connection of the heatsink 900 to the front housing portion 402. For example, it is envisioned that the heatsink 900 may be connected (secured) to the front housing portion 402 via a series of mechanical fasteners (e.g., screws, pins, or the like) that are extendable through the structural supports 902 into corresponding openings defined by the front housing portion 402.

The front housing portion 402 includes a (first) opening 412 (FIG. 5), which allows for viewing of the display 108 (FIGS. 1A, 4) through the front housing portion 402, and a receptacle 414 defining a (second) opening 416, which receives the mounting structure 500, the ISLA 700, and the sealing member 800. The opening 412 is defined by a (first) flange 418 and the opening 416 is defined by a (second) flange 420. To protect the display 108, it is envisioned that the image capture device 100 may include a shroud or other such covering (not shown), which may be formed as a separate, discrete component that is secured to the front housing portion 402 (e.g., to the flange 418) in any suitable manner, such as, for example, via bonding through the use of a heat-activated adhesive. Forming the shroud (cover) as a separate, discrete component allow for the use of a variety of different materials, which reduces (if not entirely eliminates) molding defects, thereby improving the overall fit and finish of the image capture device 100.

Extending around its perimeter, the front housing portion 402 defines a planar extension (shelf) 422 and a tongue 424 that extends rearwardly (i.e., toward the rear housing portion 404). The planar extension 422 defines a seat for the rear housing portion 404 to facilitate proper location (alignment) of the rear housing portion 404 relative to the front housing portion 402, which further enhances the overall fit and finish of the image capture device 100 upon assembly.

The rear housing portion 404 supports the interactive display 138 (FIG. 1B), as well as the circuitry and electronics supporting the operation and functionality thereof. For example, the rear housing portion 404 may include one or more flexible printed circuits (FPCs) 426 (FIG. 10), electrical connectors, the light pipe, etc., supporting imaging and tactile (touch) control of the interactive display 138. Additionally, it is envisioned that the rear housing portion 404 may include one or more conductive elements 428 (e.g., conductive foams) to ground the rear housing portion 404 relative to the battery of the image capture device 100.

The rear housing portion 404 includes a heat-conductive plate 430 (FIG. 8) that allows the rear housing portion 404 to act as an additional, independent heatsink for the image capture device 100 that is separate and discrete from the heatsink 900 (FIGS. 5, 6). Heatsink functionality is, thus, incorporated into the rear housing portion 404, thereby obviating the need for a separate heatsink that may otherwise be connected to the rear housing portion 404 and simplifying not only the overall construction of the image capture device 100, but assembly as well. To facilitate the conduction of heat, the rear housing portion 404 may include (e.g., may be formed partially or entirely from) any suitable material (e.g., aluminum) or combination of materials and may be thermally connected to one or more components of the image capture device 100 (e.g., to the image sensor(s) that receive light from the lens 104 (FIG. 1A) and/or to the image processor). It is envisioned that such thermal connections may be established in any suitable manner, such as, for example, by one or more graphite conductors. By eliminating any structural connection between the rear housing portion 404 and the heatsink 900, the number of fasteners and connections required during assembly of the image capture device 100 can be reduced, thereby simplifying assembly.

Extending around its perimeter, the rear housing portion 404 defines a recess (groove) 432 (FIGS. 8, 10) that is configured in correspondence with the tongue 424 (FIGS. 6, 7, 9) extending form the front housing portion 402. The recess 432 is configured to receive the tongue 424 such that the respective front and rear housing portions 402, 404 are connectable in a tongue-and-groove fashion. To enhance the connection between the respective front and rear housing portions 402, 404, and further facilitate the formation of a watertight seal therebetween, it is envisioned that an adhesive 434 (FIG. 10) may be applied to the tongue 424 and/or the recess 432 prior to insertion of the tongue 424 into the recess 432, as described in further detail below.

Figure 11:
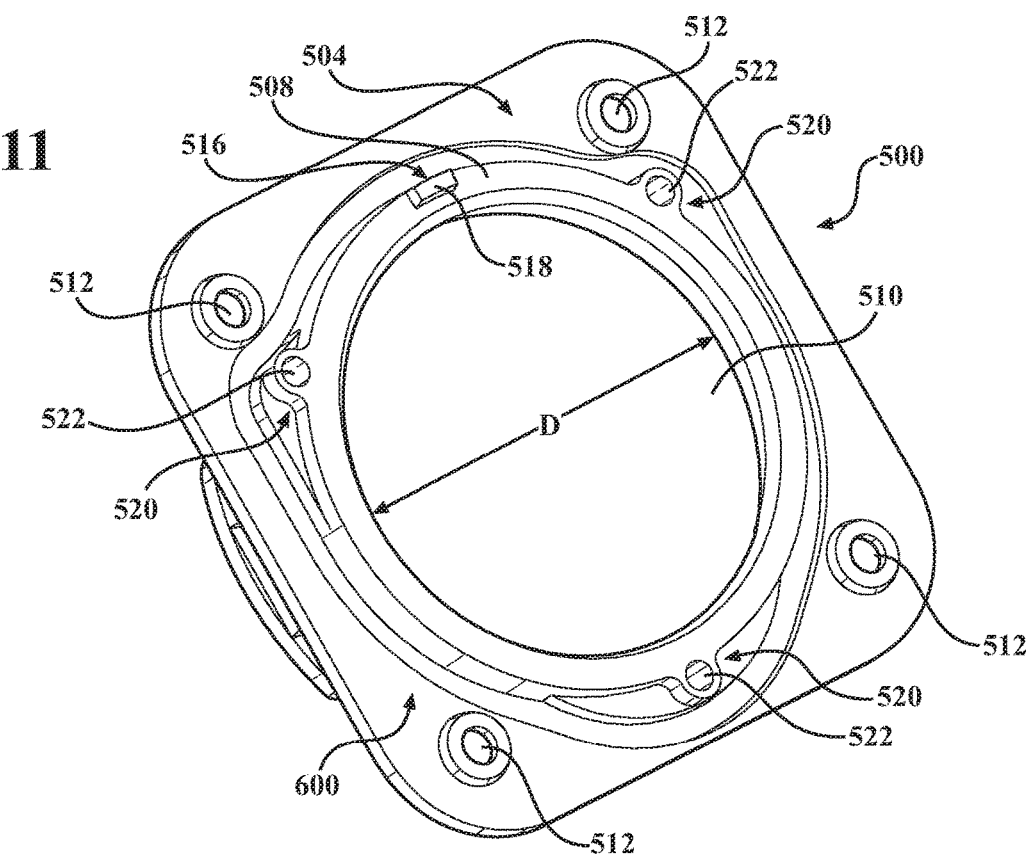
FIG. 11 is a rear, perspective view of a mounting structure that is configured for connection to the front housing portion.

With reference now to FIG. 11 as well, the mounting structure 500 will be discussed. FIG. 11 provides a rear, perspective view of the mounting structure 500, which interfaces with and/or supports support the sealing member 600, the ISLA 700, sealing member 800, and the cover 1000. The mounting structure 500 is formed as a separate, individual structure that is discrete from the front housing portion 402, the rear housing portion 404, the ISLA 700, the heatsink 900, and the cover 1000 and may include (e.g., may be formed from) any suitable material(s) of construction. To reduce (or entirely eliminate) wear on the mounting structure 500, it is envisioned that the mounting structure 500 may include (e.g., may be formed partially or entirely from) a first material of construction and that the heatsink 900 may include (e.g., may be formed partially or entirely from) a second, different material of construction. For example, in the embodiment illustrated throughout the figures, whereas the heatsink 900 may include (e.g., may be formed partially or entirely from) aluminum, it is envisioned that that mounting structure 500 may include (e.g., may be formed partially or entirely from) steel.

The mounting structure 500 is connected (secured) to the front housing portion 402 adjacent to the opening 416 (FIG. 5) defined by the flange 420 and supports the cover 1000 and the ISLA 700, each of which is configured for direct connection to the mounting structure 500, as discussed in further detail below. By directly connecting the ISLA 700 to the mounting structure 500, physical, supportive connections between the ISLA 700 and the heatsink 900 can be reduced (if not entirely eliminated), thereby simplifying assembly of the image capture device 100. The configuration of the mounting structure 500 also eliminates any direct physical connection between the cover 1000 and the heatsink 900, thereby simplifying sealing of the image capture device 100. More specifically, as described in further detail below, by sealing the mounting structure 500 to the front housing portion 402 (via the sealing member 600) and the ISLA 700 (via the sealing member 800), sealing can be localized to the mounting structure 500, which allows the overall geometry and architecture of the image capture device 100 to be simplified by eliminating the need for a perimeter seal about the heatsink 900. Moreover, the seals established between the mounting structure 500, the front housing portion 402, and the ISLA 700 by the sealing members 600, 800 allows the image capture device 100 to remain watertight upon removal of the cover 1000.

The mounting structure 500 includes a (generally planar) base 504 and respective front and rear (first and second) collars 506, 508 that extend from the base 504 in opposing (forward and rear) directions. The base 504 is configured in correspondence with the flange 420 of the front housing portion 402 such that the base 504 seats within the receptacle 414. The base 504 includes a (central) opening 510 that is configured to receive the ISLA 700 and a series of apertures 512 that extend therethrough. The apertures 512 are positioned in alignment (registration) with corresponding apertures 436 (FIG. 5) formed in the flange 420 such that the mounting structure 500 is directly connectable to the front housing portion 402 via a series of (first) mechanical fasteners 438 (FIGS. 5, 6) (e.g., screws, pins, rivets, etc.) in either a fixed or removable fashion. Although shown as including four mechanical fasteners 438 in the illustrated embodiment, it should be appreciated that the particular number of mechanical fasteners 438 may be varied without departing from the scope of the present disclosure.

To enhance the first and finish of the image capture device 100 and/or improve sealing between the mounting structure 500 and the front housing portion 402, in certain embodiments, such as that illustrated throughout the figures, it is envisioned that the receptacle 414 (FIG. 5) and the base 504 of the mounting structure 500 may include corresponding radiused corner portions.

The front collar 506 (FIG. 5) of the mounting structure 500 is generally annular in configuration and extends outwardly from the base 504 in a forward direction. The front collar 506 includes a pair of ears 514 that extend radially outward therefrom in an integral fashion. The ears 514 are configured for releasable engagement with the cover 1000 (FIG. 4) such that the cover 1000 is connectable to and disconnectable from the image capture device 100 via the mounting structure 500, as described in further detail below. While the front collar 506 is illustrated as including a pair of diametrically opposed ears 514 in the illustrated embodiment, it should be appreciated that the particular number, location, and/or configuration of ears 514 may be varied in alternate embodiments without departing from the scope of the present disclosure (e.g., depending upon the particular configuration of the cover 1000).

The rear collar 508 (FIGS. 6, 11) is generally annular in configuration and extends outwardly from the base 504 in a rearward direction. The rear collar 508 defines an inner transverse cross-sectional dimension (e.g., diameter) D and is spaced radially (laterally) inward from the apertures 512 extending through the base 504. The rear collar 508 is configured for reception by the opening 416 (FIG. 5) to further recess the mounting structure 500 within the front housing portion 402, thereby reducing the overall spatial requirements of the mounting structure 500.

The rear collar 508 includes an integral locating feature 516 (e.g., a detent 518 or other such projection) that is configured for receipt within a corresponding notch 802 (FIGS. 5, 6) defined by the sealing member 800 to facilitate proper relative orientation of the mounting structure 500 and the sealing member 800. Although shown as including a single locating feature 516 in the illustrated embodiment, it should be appreciated that the particular number and/or location of the locating feature(s) 516 may varied without departing from the scope of the present disclosure (e.g., depending upon the particular configuration of the sealing member 800).

The rear collar 508 further includes a series of eyelets 520 (FIG. 11) extending radially outward therefrom that are configured for reception within corresponding reliefs 440 (FIGS. 5, 7) (e.g., cutouts, notches, indentations, etc.) defined by the flange 420 to further facilitate proper orientation of the mounting structure 500 relative to the front housing portion 402. Each eyelet 520 defines an aperture 522 that extends partially through the mounting structure 500. The eyelets 520 and the apertures 522 are positioned in alignment (registration) with corresponding apertures 702 (FIGS. 5, 6) in the ISLA 700 such that the ISLA 700 is directly connectable to the mounting structure 500 via a series of (second) mechanical fasteners 442 (e.g., screws, pins, rivets, etc.) in either a fixed or removable fashion. Although shown as including three eyelets 520 and apertures 522 that are spaced (approximately) equidistant from each other (e.g., such that the apertures 522 are separated by approximately 120°), it should be appreciated that the particular number and/or location of the eyelets 520 and the apertures 522 may varied without departing from the scope of the present disclosure (e.g., depending upon the particular configuration of the ISLA 700).

The sealing member 600 (FIGS. 5, 6, 11) is located between the mounting structure 500 and the front housing portion 402. More specifically, the sealing member 600 is positioned about the rear collar 508 of the mounting structure 500 within a corresponding channel 444 (FIG. 5) defined by the flange 420 such that the sealing member 600 extends between the apertures 512 in the base 504 and the eyelets 520, which are received by the reliefs 440 such that the eyelets 520 extend into the channel 444. More specifically, the sealing member 600 is positioned laterally inward of the apertures 512 and laterally outward of the eyelets 520. To facilitate such location, in certain embodiments, such as that shown throughout the figures, the sealing member 600 may include a (first) non-annular configuration that may be characterized as generally escutcheon or shield shaped. More specifically, in the illustrated embodiment, the sealing member 600 includes a series of first segments 602*ia*, 602*ib*, 602*ic* that are separated by a series of second segments 602*iia*, 602*iib*, 602*iic*, whereby the segments 602*ia*, 602*ib* are separated by the segment 602*iib*, the segments 602*ib*, 602*ic* are separated by the segment 602*iic*, and the segments 602*ia*, 602*ic* are separated by the segment 602*iia*. The segments 602*ia*, 602*ib*, 602*ic* extend (generally) between the apertures 512 and each define a (generally equivalent) first curvature that generally corresponds to that of the rear collar 508 of the mounting structure 500. The segments 602*iia*, 602*iib*, 602*iic* are positioned adjacent to, and are configured to accommodate, the eyelets 520. More specifically, the segments 602*iia*, 602*iib*, 602*iic* each define a (generally equivalent) second curvature greater than the first curvature that generally corresponds to that of the eyelets 520 such that the segments 602*iia*, 602*iib*, 602*iic* extend about the eyelets 520. Alternative configurations for the sealing member 600, however, would not be beyond the scope of the present disclosure. For example, an embodiment of the sealing member 600 including a generally annular configuration (e.g., an embodiment devoid of the defined segments 602*ia*, 602*ib*, 602*ic*, 602*iia*, 602*iib*, 602*iic* discussed above) is also contemplated herein. Additionally, while the sealing member 600 is illustrated as including a generally circular (annular) cross-sectional configuration, it should be appreciated that the particular cross-sectional configuration of the sealing member 600 may be varied in alternate embodiments without departing from the scope of the present disclosure. For example, it is envisioned that the sealing member 600 may instead include a (generally) elliptical or polygonal cross-sectional configuration.

The sealing member 600 defines a (central) opening 604 for receipt of the rear collar 508 of the mounting structure 500 and the ISLA 700. The sealing member 600 is configured to form a watertight seal between the mounting structure 500 and the front housing portion 402 and may include (e.g., may be formed partially or entirely from) any material or combination of materials suitable for this intended purpose. For example, in the illustrated embodiment, the sealing member 600 includes (e.g., is formed partially or entirely from) silicone. It should be appreciated, however, that the use of alternative material(s) of construction would not be beyond the scope of the present disclosure.

Figure 12:
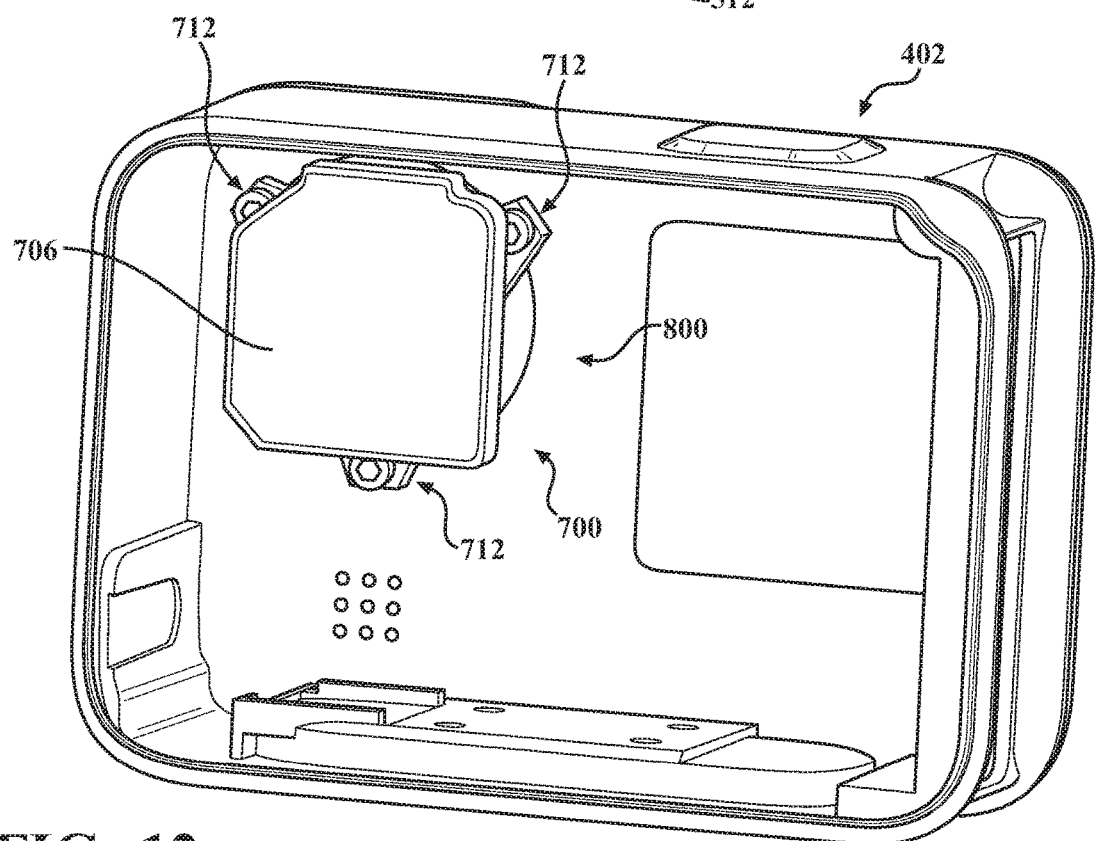
FIG. 12 is a rear, perspective view of the front housing portion illustrating the connection of an integrated sensor-lens assembly (ISLA) to the front housing portion via the mounting structure seen in FIG. 11.

Referring to FIG. 12 as well, which provides a rear, perspective view of the front housing portion illustrating connection of the ISLA 700 via the mounting structure 500, the ISLA 700 will be discussed. The ISLA 700 (FIGS. 5, 6, 12) includes a body 704 supporting an image sensor 706 and a lens 708, whereby the image sensor 706 and the lens 708 are integrated into a single assembly. The ISLA 700 receives and focuses light and converts captured content into an electronic image signal that is processed to form an image. The ISLA 700 extends through an opening 906 in the heatsink 900, which allows for direct connection (securement) of the ISLA 700 to the mounting structure 500 such that the ISLA 700 (e.g., the lens 708) extends through the opening 416 defined by the flange 420 of the front housing portion 402. To facilitate such connection, the ISLA 700 includes a collar 710 supporting a series of wings 712 that extend radially outward therefrom, which include the aforedescribed apertures 702. The collar 710 defines an outer transverse cross-sectional dimension (e.g., diameter) $D_c$ (FIG. 5) and is concentrically positioned relative to the lens 708 so as to define a (generally annular) shoulder 714 that supports the sealing member 800. Upon assembly of the image capture device 100, the mechanical fasteners 442 are inserted through the apertures 702 in the wings 712 (in a forward direction) and into the apertures 522 in the eyelets 520 on the rear collar 508 of the mounting structure 500, thereby directly securing together the ISLA 700 and the mounting structure 500.

Although shown as including three wings 712 that are spaced (approximately) equidistant from each other (e.g., such that the wings 712 are separated by approximately 120°), it should be appreciated that the particular number and/or location of the wings 712 may varied without departing from the scope of the present disclosure (e.g., depending upon spatial requirements, the particular configurations of the ISLA 700 and the heatsink 900, etc.).

In certain embodiments, such as that illustrated throughout the figures, it is envisioned that the heatsink 900 may include one or more recesses 908 (FIG. 5) that are configured in correspondence with the sealing member 800 (as described in further detail below) and series of reliefs 910 (e.g., cutouts, notches, indentations, etc.) that are configured in correspondence with the wings 712 of the ISLA 700. As such, in the illustrated embodiment, the heatsink 900 includes three reliefs 910 that are spaced (approximately) equidistant from each other (e.g., such that the reliefs 910 are separated by approximately 120°). It should be appreciated, however, that the particular number and/or location of the reliefs 910 may be varied without departing from the scope of the present disclosure (e.g., depending upon the particular number and/or location of the wings 712 included on the ISLA 700).

Upon assembly of the image capture device 100, the lens 708 of the ISLA 700 extends through the opening 909 and the wings 712 extend through the reliefs 910, which not only facilitates proper alignment (registration) of the ISLA 700 and the heatsink 900, but reduces the overall spatial requirements of the heatsink 900 and the ISLA 700.

By directly connecting the ISLA 700 to the mounting structure 500, physical, supportive connections between the ISLA 700 and the heatsink 900 can be reduced, thereby simplifying assembly of the image capture device 100. More specifically, the architecture described herein allows for a complete elimination of any physical connection between the ISLA 700 and the heatsink 900. Additionally, connection of the ISLA 700 directly to the mounting structure 500, rather than via an intermediate component (such as the heatsink 900, for example), enables precise alignment of the ISLA 700 and the mounting structure 500, which, thus, enables precise alignment of the cover 1000, the mounting structure 500, and the ISLA 700. By increasing precision in the alignment of the cover 1000 and the ISLA 700 (via the mounting structure 500 located therebetween), basic functionality of the image capture device 100 can be improved. Moreover, direct connection of the ISLA 700 to the mounting structure 500 increases precision in the relative alignment of the ISLA 700 and the front housing portion 402, which not only simplifies assembly of the image capture device 100 by reducing the number of alignments that must occur, but enhances the overall fit and finish of the image capture device 100.

The sealing member 800 (FIGS. 5, 6) is located between the mounting structure 500 and the ISLA 700. More specifically, the sealing member 800 is positioned about the lens 708 of the ISLA 700 such that the sealing member 800 is supported by the shoulder 714 defined by the collar 710. The sealing member 800 forms watertight seals with both the mounting structure 500 and the ISLA 700 upon assembly of the image capture device 100, thereby obviating any need to form a direct seal between the ISLA 700 and the front housing portion 402, and may include any material(s) suitable for this intended purpose. For example, in the particular embodiment illustrated throughout the figures, the sealing member 800 includes (e.g., is formed partially or entirely from) conductive silicone, which facilitates grounding of the heatsink 900 relative to the mounting structure 500 (via the sealing member 800). It should be appreciated, however, that the use of alternative material(s) of construction would not be beyond the scope of the present disclosure.

The sealing member 800 includes a (second, generally annular) configuration that differs from that of the sealing member 600. More specifically, the sealing member 800 includes a rib 804 and a plurality of feet 806 that extend radially outward from the rib 804. The rib 804 is (generally) annular in configuration and defines a (central) opening 808 for receipt of the ISLA 700, an inner transverse cross-sectional dimension (e.g., diameter) $D_{ri}$ (FIG. 5), and an outer transverse cross-sectional dimension (e.g., diameter) $D_{ro}$. The inner transverse cross-sectional dimension (e.g., diameter) $D_{ri}$ is greater than the outer transverse cross-sectional dimension (e.g., diameter) $D_c$ defined by the collar 710 of the ISLA 700 and the outer transverse cross-sectional dimension (e.g., diameter) $D_{ro}$ is less than the inner transverse cross-sectional dimension D (FIG. 11) defined by the rear collar 508 of the mounting structure 500, which allows the rib 804 to be positioned concentrically about the collar 710 and concentrically within the rear collar 508 upon assembly of the image capture device 100. The relative dimensioning between the collar 710, the rib 804, and the rear collar 508 allows the sealing member 800 to simultaneously contact (engage) the ISLA 700 and the mounting structure 500, thereby forming watertight seals with each and, thus, sealing together the ISLA 700, the mounting structure 500, and the front housing portion 402. More specifically, the sealing member 800 seals with the ISLA 700 at the interface of the rib 804 and the collar 710 and with the mounting structure 500 at the interfaces between the rear collar 508, the rib 804, and outer (forward) surfaces 810 (FIG. 5) of the feet 806.

The feet 806 are configured for reception by and seating within the recesses 908 defined by the heatsink 900 and are circumferentially spaced from each other so as to define windows 812 therebetween. The windows 812 are positioned in alignment (registration) with the wings 712 extending from the collar 710 of the ISLA 700 such that the wings 712 and, thus, the mechanical fasteners 442, are received by (and extend through) the windows 812 upon assembly of the image capture device 100. While the illustrated embodiment of the sealing member 800 is shown as including three feet 806i, 806ii, 806iii that are spaced (approximately) equidistant from each other (e.g., such that centerpoints thereof are separated by approximately 120°) and three windows 812i, 812ii, 812iii that are spaced (approximately) equidistant from each other (e.g., such that centerpoints thereof are separated by approximately 120°), it should be appreciated that the specific number, location, and/or configuration of the feet 806 and/or the windows 812 may be varied without departing from the scope of the present disclosure (e.g., depending upon the particular configuration of the ISLA 700).

In certain embodiments, such as that seen throughout the figures, it is envisioned that the sealing member 800 may include one or more contacts 814 (FIG. 6) to facilitate grounding of the heatsink 900 relative to the mounting structure 500. Although shown as being positioned on rear surfaces 816 of the feet 806, it should be appreciated that the particular location of the contact(s) 814 may be varied in alternate embodiments without departing from the scope of the present disclosure.

The (uppermost) foot 806ii includes the aforementioned notch 802, which is configured to receive the locating feature 516 (FIG. 11) extending from the rear collar 508 of the mounting structure 500 to facilitate proper relative orientation of the mounting structure 500 and the sealing member 800. Although shown as including a single notch 802 in the illustrated embodiment, it should be appreciated that the particular number and/or location of the notch(es) 802 may varied without departing from the scope of the present disclosure (e.g., depending upon the particular configuration of the mounting structure 500). For example, it is envisioned that each foot 806 may define a notch 802 that is configured to receive a corresponding locating feature 516 extending from the rear collar 508.

With reference now to FIG. 4 and FIG. 13, the cover 1000 will be discussed. FIG. 13 provides a front, perspective view of the housing assembly with the cover 1000 connected to the mounting structure 500. The cover 1000 functions as a removable cap that protects and conceals the ISLA 700 and includes a frame 1002 and an insert 1004 that is supported by the frame 1002. The insert 1004 includes (e.g., is formed partially or entirely from) an optically clear material so as to permit image capture through the cover 1000 without interference. Although shown as being generally square-shaped in configuration throughout the figures, it should be appreciated that the specific configuration of the cover 1000 may be varied in alternate embodiments without departing from the scope of the present disclosure (e.g., depending upon the particular configuration of the ISLA 700 and/or the front housing portion 402, the desired aesthetic appearance of the image capture device 100, etc.).

The cover 1000 and the mounting structure 500 are configured for direct connection. More specifically, the cover 1000 is configured for removable connection to the ears 514 extending radially outward from the front collar 506 of the mounting structure 500. For example, the cover 1000 may include one or more pockets (or other such recesses or openings) that are configured in correspondence with the ears 514. To facilitate connection and disconnection of the cover 1000, it is envisioned that the ears 514 may include (or otherwise define) angled (e.g., chamfered) bearing surfaces 524 that are configured to urge the cover 1000 outwardly (away from the front housing portion 402) upon rotation of the cover 1000.

Directly connecting the cover 1000 to the mounting structure 500 allows for the elimination of any interposed components (e.g., the heatsink 900 (FIGS. 5, 6)) between the cover 1000, the mounting structure 500, and the front housing portion 402. The elimination of interposed components between the cover 1000, the mounting structure 500, and the front housing portion 402 reduces the number of components that must be properly aligned during assembly of the image capture device 100, which not only simplifies the assembly process, but improves the overall alignment of the cover 1000 relative to the front housing portion 402 and the ISLA 700 (FIGS. 5, 6), thereby enhancing the overall fit and finish of the image capture device 100.

To facilitate sealing between the cover 1000 and the mounting structure 500, the image capture device 100 includes a sealing member 1100 (e.g., an O-ring 1102) that is positioned between the cover 1000 and the mounting structure 500. More specifically, upon connection of the cover 1000 to the mounting structure 500, the sealing member 1100 is positioned within a corresponding (generally annular) groove 1006 defined by the cover 1000 and is received by the front collar 506 such that the sealing member 1100 is concentrically positioned within the front collar 506 so as to form a watertight seal between the cover 1000 and the mounting structure 500. While the sealing member 1100 is illustrated as including a generally circular (annular) cross-sectional configuration, it should be appreciated that the particular configuration of the sealing member 1100 may be varied in alternate embodiments without departing from the scope of the present disclosure.

Figure 15:
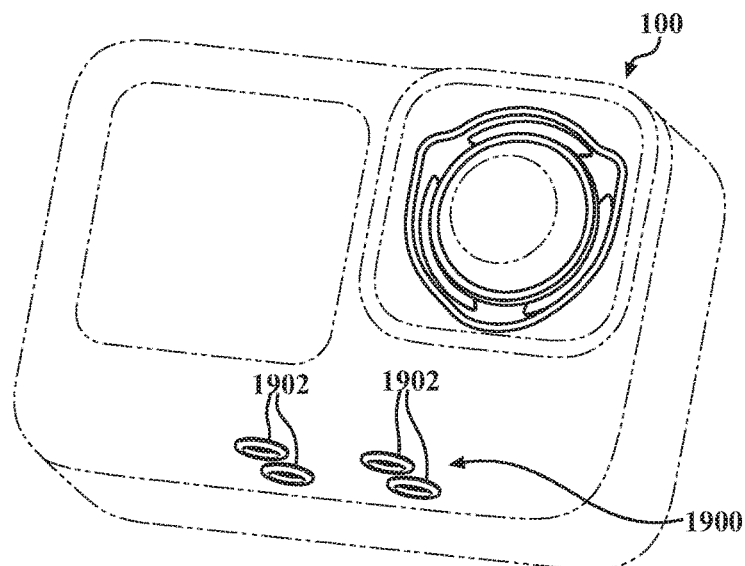

To further enhance sealing of the image capture device 100, it is envisioned that the image capture device 100 may include a variety of additional sealing members. For example, as seen in FIGS. 14 and 15, which provide front, perspective views of the image capture device 100, the image capture device 100 may include a sealing member 1200 that is configured to form a watertight seal between the front housing portion 402 and the door 114; a sealing member 1300 that is configured to form a watertight seal about the light pipe; a sealing member 1400 that is configured to form a watertight seal about one or more (top, upper) microphones; a sealing member 1500 that is configured to form a watertight seal about one or more (side, lateral) microphones; a sealing member 1600 that is configured to form a watertight seal about one or more vents that allow for pressure equalization with the external environment by allowing air to pass therethrough; and a sealing member 1700 that is supported by an external (e.g. lower) surface of the front housing portion 402 (rather than being positioned internally) so as to form a watertight seal about one or more speakers. The image capture device 100 may further include a sealing member 1800 that is configured to form a watertight seal about one or more (front and/or rear) microphones. As seen in FIG. 14, for example, the sealing member 1800 includes an array of openings 1802 (e.g., arranged in a 3×3 pattern), rather than a single opening 1802, to thereby improves acoustics.

To facilitate sealing between the heatsink 900 (FIGS. 5, 6) and the front housing portion 402 it is envisioned that the image capture device 100 may also include one or more sealing members 1900. For example, as seen in FIG. 15, the sealing member(s) 1900 may be configured and positioned to form a watertight seal about the interconnect mechanism 136 (FIG. 1B), which may allow for direct connection of the interconnect mechanism 136 to the heatsink 900. Although shown as including four sealing members 1900 that are generally annular in configuration (e.g., O-rings 1902), it should be appreciated that the particular number, location, and/or configuration of the sealing member(s) 1900 may be varied in alternate embodiments without departing from the scope of the present disclosure. By including separate, discrete sealing members 1900, it is envisioned that assembly of the image capture device 100 may be simplified by obviating the need for a larger seal that may otherwise be required to seal the perimeter of the heatsink 900 to the front housing portion 402.

Figure 16:
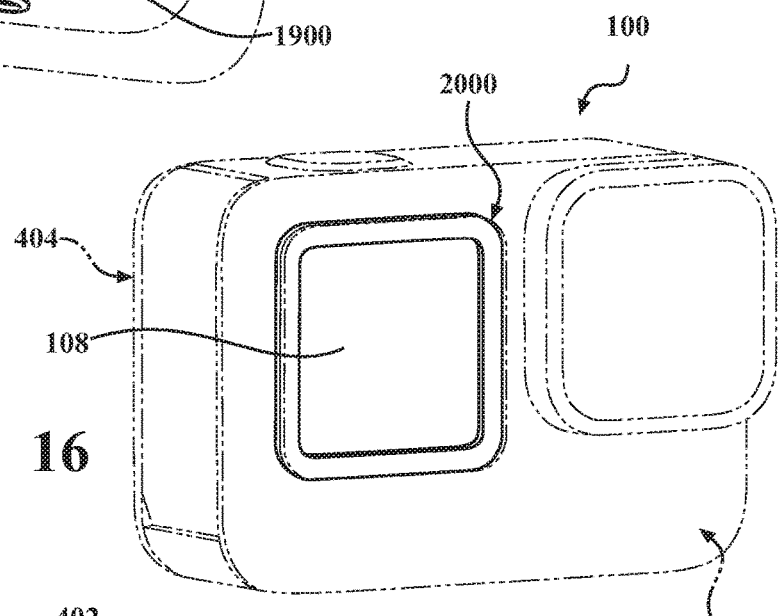
FIG. 16 is a front, perspective view of the housing assembly illustrating sealing of a front display.
Figure 17:
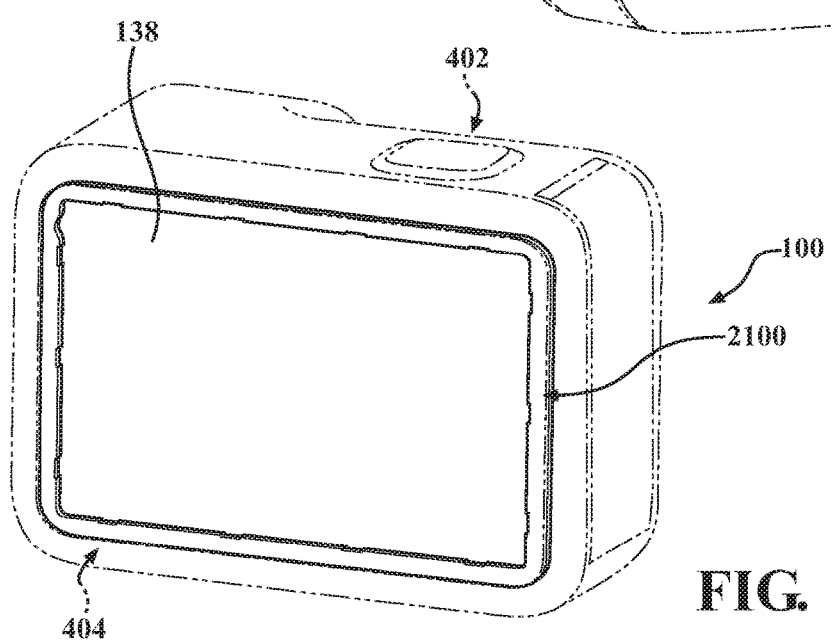
FIG. 17 is a rear, perspective view of the housing assembly illustrating sealing of a rear display.

With reference to FIGS. 16 and 17, which provide front and rear perspective views of the image capture device 100, respectively, the image capture device 100 may further include a (front) sealing member 2000 and a (rear) sealing member 2100. The sealing members 2000, 2100 are configured in correspondence with the display 108 and the interactive display 138, respectively, to thereby form a watertight seal between the display 108 and the front housing portion 402 and a watertight seal between the interactive display 138 and the rear housing portion 404.

With reference now to FIGS. 4-6, assembly of the image capture device 100 will be discussed. Initially, the mounting structure 500 is (externally) connected to the front housing portion 402 via the mechanical fasteners 438, which are inserted rearwardly. More specifically, the base 504 is positioned adjacent to the flange 420 such that the sealing member 600 is positioned and compressed therebetween so as to form a watertight seal between the front housing portion 402 and the mounting structure 500. Thereafter, the light pipe, the drain cover, etc., and the heatsink 900 are connected (secured) to the front housing portion 402. The GPS board, the main board, the battery cage, etc., are then connected to the heatsink 900 and any other necessary electrical connections are made.

With the heatsink 900 in place, the sealing member 800 is brought into contact (engagement) with the mounting structure 500 by positioning the sealing member 800 such that the rib 804 is received by the rear collar 508. Thereafter, the ISLA 700 is positioned such that the lens 708 extends through the heatsink 900 (via the opening 906), through the sealing member 800, through the front housing portion 402, through the sealing member 600, and through the mounting structure 500. When so positioned, the collar 710 of the ISLA 700 is received by the rib 804 of the sealing member 800 and the wings 712 are received by the windows 812 defined between the feet 806. The ISLA 700 is then connected to the mounting structure 500 via forward insertion of the mechanical fasteners 442 through the apertures 702 in the wings 712, through the sealing member 800, and into the apertures 522 in the eyelets 520 of the rear collar 508 of the mounting structure 500, thereby compressing the sealing member 800 between the ISLA 700 and the mounting structure 500 and sealing together the ISLA 700, the mounting structure 500, and the front housing portion 402 via the sealing members 600, 800.

Following connection of the ISLA 700 to the mounting structure 500, the interactive display 138 (FIG. 1B) is connected (secured) and sealed to the rear housing portion 404 and the adhesive 434 (FIG. 10) is applied to the recess 432 defined by the rear housing portion 404 and/or the tongue 424 extending from the front housing portion 402. Before the adhesive 434 dries (cures), the rear housing portion 404 is electrically connected to the heatsink 900 (e.g., via the FPC(s) 426 (FIG. 10)) and the respective front and rear housing portions 402, 404 are connected via insertion of the tongue 424 within the recess 432. The adhesive 434 is then allowed to dry (cure) to connect (secure) together the housing portions 402, 404 and form a seal therebetween, establishing a watertight internal environment for the components of the image capture device 100. The interconnect mechanism 136 (FIG. 1B) can then be connected and the cover 1000 can be connected to the mounting structure 500 via the ears 514 on the front collar 506.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result, and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification, and represents embodiments of the present disclosure. Also, the phrases "at least one of A, B, and C" and "A and/or B and/or C" should each be interpreted to include only A, only B, only C, or any combination of A, B, and C.

What is claimed is:

1. A housing assembly for an image capture device, the housing assembly comprising:
   a front housing portion defining an opening;
   a rear housing portion connected to the front housing portion so as to form a watertight seal therebetween;
   a mounting structure connected to the front housing portion adjacent to the opening and including a locating feature extending towards the rear housing portion, the mounting structure being configured as a discrete component separate from the front housing portion and the rear housing portion;

a first sealing member positioned between the mounting structure and the front housing portion and configured to form a watertight seal therebetween;

an integrated sensor-lens assembly (ISLA) connected to the mounting structure such that the ISLA extends through the opening in the front housing portion; and a second sealing member positioned between the ISLA and the mounting structure and configured to form a watertight seal therebetween, the second sealing member defining an opening configured to receive the ISLA and a notch configured to receive the locating feature to facilitate proper relative orientation of the mounting structure and the second sealing member.

2. The housing assembly of claim 1, wherein the front housing portion defines a tongue and the rear housing portion defines a recess configured to receive the tongue, the housing assembly including an adhesive to secure the tongue within the recess to thereby form the watertight seal between the front housing portion and the rear housing portion.

3. The housing assembly of claim 1, wherein the front housing portion includes a flange defining the opening, the mounting structure being connected to the flange.

4. The housing assembly of claim 3, wherein the flange defines a channel configured to receive the first sealing member.

5. The housing assembly of claim 1, wherein the first sealing member defines a first configuration and the second sealing member defines a second configuration different from the first configuration.

6. The housing assembly of claim 1, wherein the mounting structure includes first openings configured to receive first fasteners to secure the mounting structure to the front housing portion and second openings configured to receive second fasteners to secure the ISLA to the mounting structure.

7. The housing assembly of claim 6, wherein the second sealing member includes a rib and feet extending radially outward from the rib.

8. The housing assembly of claim 7, wherein the feet are spaced circumferentially from each other so as to define windows therebetween configured to receive the second fasteners such that the second fasteners are extendable through the ISLA and the second sealing member into the mounting structure.

9. The housing assembly of claim 1, wherein the mounting structure is configured for removable connection to a cover configured to conceal the ISLA, whereby the mounting structure facilitates alignment between the cover and the ISLA and between the cover and the front housing portion.

10. The housing assembly of claim 9, further including a third sealing member positioned between the cover and the mounting structure and configured to form a watertight seal therebetween.

11. The housing assembly of claim 10, wherein the mounting structure includes a collar and ears extending radially outward from the collar.

12. The housing assembly of claim 11, wherein the third sealing member is received by the collar.

13. A housing assembly for an image capture device, the housing assembly comprising:
a front housing portion;
a rear housing portion connected to the front housing portion so as to form a watertight seal therebetween;
a mounting structure including:
first openings configured to receive first fasteners such that the first fasteners extend through the mounting structure and into the front housing portion in a first direction to thereby connect the mounting structure to the front housing portion; and
second openings configured to receive second fasteners such that the second fasteners extend through the mounting structure in a second direction opposite to the first direction; and
an integrated sensor-lens assembly (ISLA) connected to the mounting structure via the second fasteners.

14. The housing assembly of claim 13, wherein the ISLA is directly connected to the mounting structure.

15. The housing assembly of claim 14, further including a heatsink, wherein the ISLA extends through the heatsink and the mounting structure is formed as a discrete component separate from the heatsink.

16. The housing assembly of claim 13, wherein the mounting structure is sealingly connected to both the front housing portion and the ISLA.

17. The housing assembly of claim 16, further including a first sealing member positioned between the front housing portion and the mounting structure and a second sealing member positioned between the mounting structure and the ISLA, the first sealing member and the second sealing member having different configurations.

18. A housing assembly for an image capture device, the housing assembly comprising:
a housing portion;
a mounting structure including:
first openings configured to receive first fasteners such that the first fasteners extend through the mounting structure and into the housing portion in a first direction to thereby connect the mounting structure to the housing portion; and
second openings configured to receive second fasteners such that the second fasteners extend through the mounting structure in a second direction opposite to the first direction;
an integrated sensor-lens assembly (ISLA) directly connected to the mounting structure via the second fasteners such that the ISLA extends through the housing portion; and
a cover configured for removable connection to the mounting structure to thereby conceal the ISLA.

19. The housing assembly of claim 18, wherein the mounting structure and the housing portion are configured as discrete components.

20. The housing assembly of claim 18, wherein the mounting structure is removably connected to the housing portion and the ISLA is removably connected to the mounting structure.

* * * * *